US007343833B2

(12) United States Patent
Matsushima

(10) Patent No.: US 7,343,833 B2
(45) Date of Patent: Mar. 18, 2008

(54) BREATHER APPARATUS OF CRANKCASE

(75) Inventor: Toshiyuki Matsushima, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 734 days.

(21) Appl. No.: 10/848,700

(22) Filed: May 19, 2004

(65) Prior Publication Data

US 2004/0231925 A1 Nov. 25, 2004

(30) Foreign Application Priority Data

May 19, 2003 (JP) ............................. 2003-140548

(51) Int. Cl.
*F16H 57/02* (2006.01)

(52) U.S. Cl. ....................... 74/607; 74/606 R; 123/516; 184/6.21; 184/6.24

(58) Field of Classification Search .............. 74/606 R, 74/606 A; 123/516; 184/6.21, 6.23, 6.24
See application file for complete search history.

(56) References Cited

U.S. PATENT DOCUMENTS

2002/0040706 A1* 4/2002 Katayama et al. .......... 123/516
2003/0000504 A1* 1/2003 Katayama et al. .......... 123/516

FOREIGN PATENT DOCUMENTS

| | | |
|---|---|---|
| EP | 0 926 319 A1 | 11/1998 |
| JP | 62-169210 | 10/1987 |
| JP | 2-101007 | 8/1990 |
| JP | 08-218842 | 8/1996 |
| JP | 2001-065326 | 3/2001 |
| JP | 2001-329827 | 11/2001 |
| JP | 2002-256838 | 9/2002 |

OTHER PUBLICATIONS

Canadian Office Action dated Jul. 31, 2006.

* cited by examiner

*Primary Examiner*—David M. Fenstermacher
(74) *Attorney, Agent, or Firm*—Smith, Gambrell & Russell, LLP

(57) ABSTRACT

A breather apparatus of a crankcase, in which lubricating oil is circulated with economy of space and efficiently, is provided. An opening is formed in the top of a vertical wall of a case body, and a breather hole is formed in the top of an outer circumferential wall of the case body. A lubricating-oil return port is formed in the bottom of the vertical wall of the case body, and a breather path communicating with the opening and the lubricating-oil return port is provided between the case body and a power-generator case used as a wall body attached thereto, and an air-breather path branching from the breather path and communicating with the breather hole is provided in the case body. When an oil-component mixed gas flowing through the opening to the outside of the case body hits an inner surface of the breather path, an oil component of the oil-component mixed gas is liquefied and flows into the lubricating-oil return port.

20 Claims, 4 Drawing Sheets

BREATHER APPARATUS OF CRANKCASE

BACKGROUND OF THE INVENTION

The present invention relates to a breather apparatus of a crankcase, in which a crankshaft is rotatably supported and lubricating oil is accommodated in a bottom of a crank chamber thereof.

In the crank chamber of an engine, the lubricating oil supplied to mutual sliding portions of parts assembled in the crank chamber is accommodated. This lubricating oil is agitated by an oil scraper or oil pickup generally attached to the crankshaft and becomes oil mist with which the inside of the crank chamber is filled. Meanwhile, to eliminate pressure fluctuation occurring in the crank chamber owing to operations of the engine, a breather hole for ventilating the inside and outside of the crank chamber is provided in the crankcase. Therefore, to reduce consumption of the lubricating oil, it is necessary to prevent the lubricating oil from leaking out from the breather hole.

Thus far, there has been known a technology for preventing oil components from leaking out, by providing the breather hole in an exit of the complicated breather chamber and preventing oil components larger in specific gravity than gas components from reaching the breather hole. For example, in the technology disclosed in Patent Document 1 (Japanese Patent Laid-open No. 2001-329827), a breather chamber is formed at a top of a crankcase and a gap is provided between the breather chamber and a timing chain chamber, so that an oil-component mixed gas in the crankcase is made to flow through this gap into the breather chamber. Further, to improve a gas-liquid separating action, a bulkhead is provided so as to protrude therefrom on the way of the gap. In the same manner, in the technologies disclosed in, for example, Patent Document 2 (Japanese Patent Laid-open No. 2002-256838) and Patent Document 3 (Japanese Patent Laid-open No. 2001-65326), a breather chamber having a predetermined volume is provided to return oil components contained in an oil-component mixed gas, to the crank chamber.

SUMMARY OF THE INVENTION

Conventionally, since gas-liquid separation of the oil-component mixed gas is basically carried out in the breather chamber, it is required to enlarge the breather chamber for the purpose of improving this gas-liquid separation action. However, in the case of providing the breather chamber at a side portion of the crankcase, if the volume of the breather chamber is merely-enlarged, the width dimension of the engine is increased.

Also, because a guiding path for collecting the oil components separated in the breather chamber and for collecting oil liquefied by hitting a wall surface of the breather path and attached thereto is not provided, it takes much time for these oil components to return to an oil pan. As a result, due to such low efficiency of collection of the lubricating oil, there is increased an accumulative amount of lubricating oil necessary for making constant an oil amount circulated in the crank chamber.

An object of the present invention is to provide a breather apparatus of a crankcase, in which the lubricating oil is circulated with economy of space and efficiently.

A breather apparatus of a crankcase according to the present invention comprises: a crankcase rotatably supporting a crankshaft and accommodating lubricating oil in a bottom of a crank chamber; a wall body attached to said crankcase and forming a breather path between an opening formed in a top of said crankcase and a lubricating-oil return port formed in a bottom of said crankcase; and an air-breather path provided so as to branch from said breather path, and guiding upwardly a gas component of an oil-component mixed gas flowing into said breather path.

The breather apparatus of a crankcase according to the present invention further comprises a guiding member provided in said crankcase, the guiding member guiding an oil component flowing from said lubricating-oil return port, toward a strainer provided in a bottom of said crankcase.

In a breather apparatus of a crankcase according to the present invention, the breather path and the air-breather path are formed by the wall body attached to the outside of the crankcase and the crankcase. Therefore, it is possible to perform a breather in the crank chamber without increasing the width dimension of the crankcase. By the breather path expanding toward the bottom of the crankcase, the lubricating oil liquefied on the inner circumferential surface of the breather path can be made to flow smoothly into the lubricating-oil return port without being accumulated therein. The air-breather path branching from the breather path is provided upward, whereby it is possible to prevent the lubricating oil from leaking out from the breather hole.

DESCRIPTION OF THE PREFERRED EMBODIMENT

Figure 1:
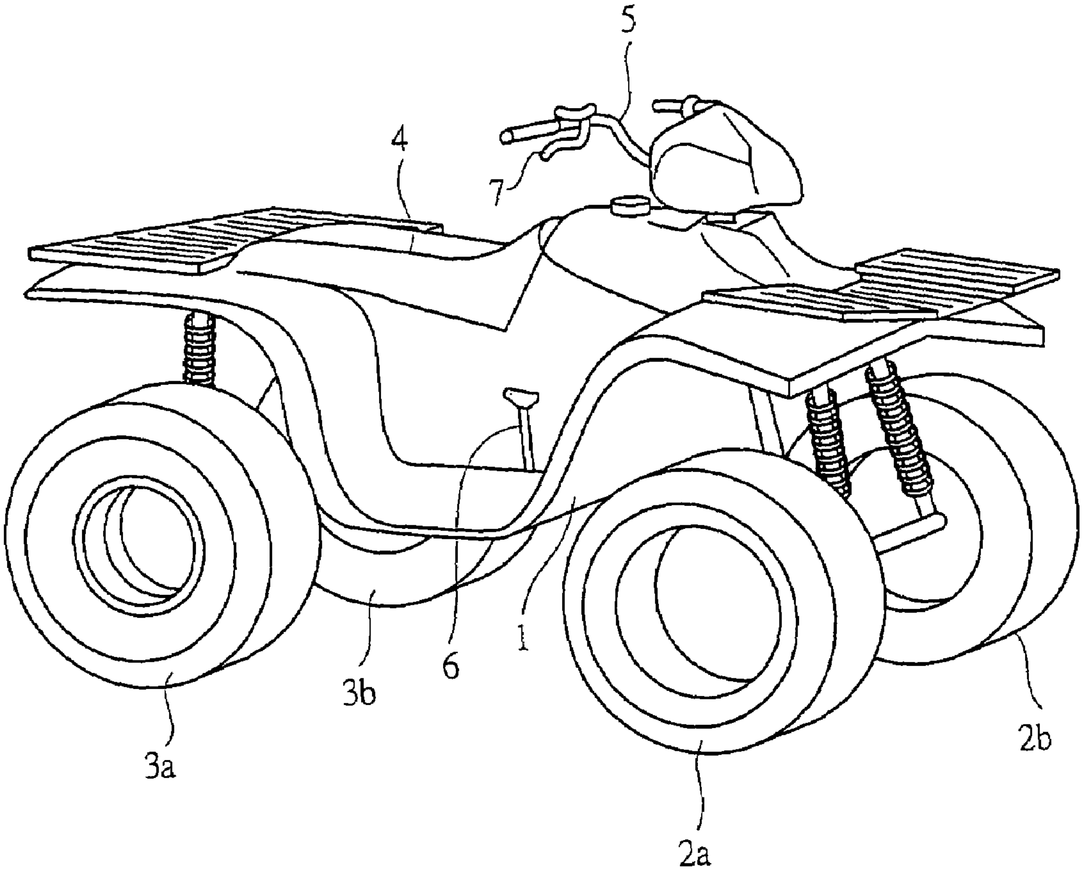
FIG. 1 is a perspective view showing one example of an all-terrain running vehicle.

Hereafter, an embodiment of the present invention will be detailed based on the drawings. FIG. 1 is a perspective view showing one example of an unpaved ground running vehicle or an all-terrain running vehicle also referred to as a buggy vehicle, wherein front wheels 2*a* and 2*b* and rear wheels 3*a* and 3*b* are provided to a vehicle body 1, and a saddle-type seat 4 is provided at the center of the vehicle body 1. A driver sitting on the seat 4 operates a handlebar 5 and drives the vehicle.

Figure 2:
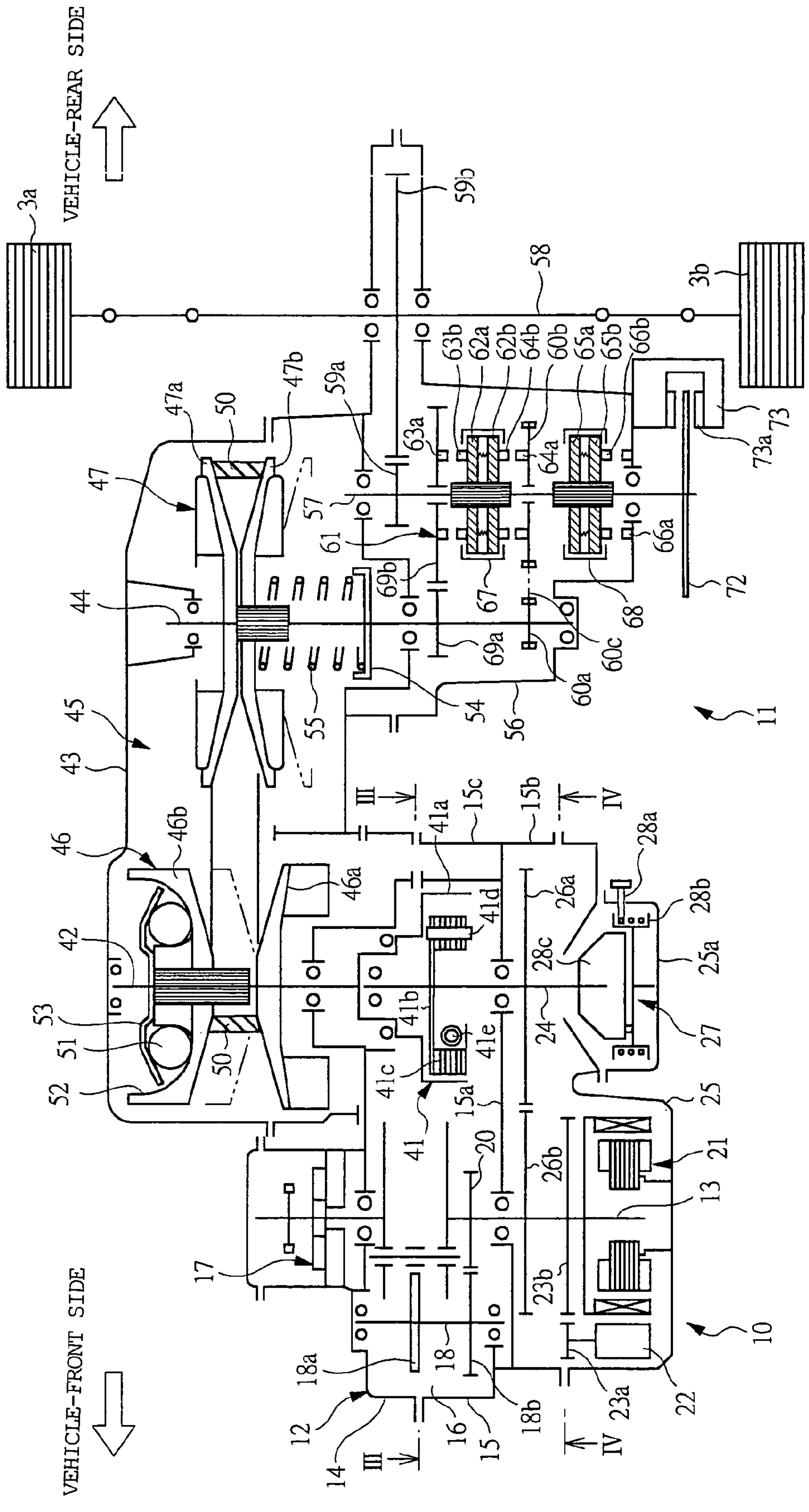
FIG. 2 is a schematic diagram showing a power transmission system to be mounted on the all-terrain running vehicle shown in FIG. 1.
Figure 3:
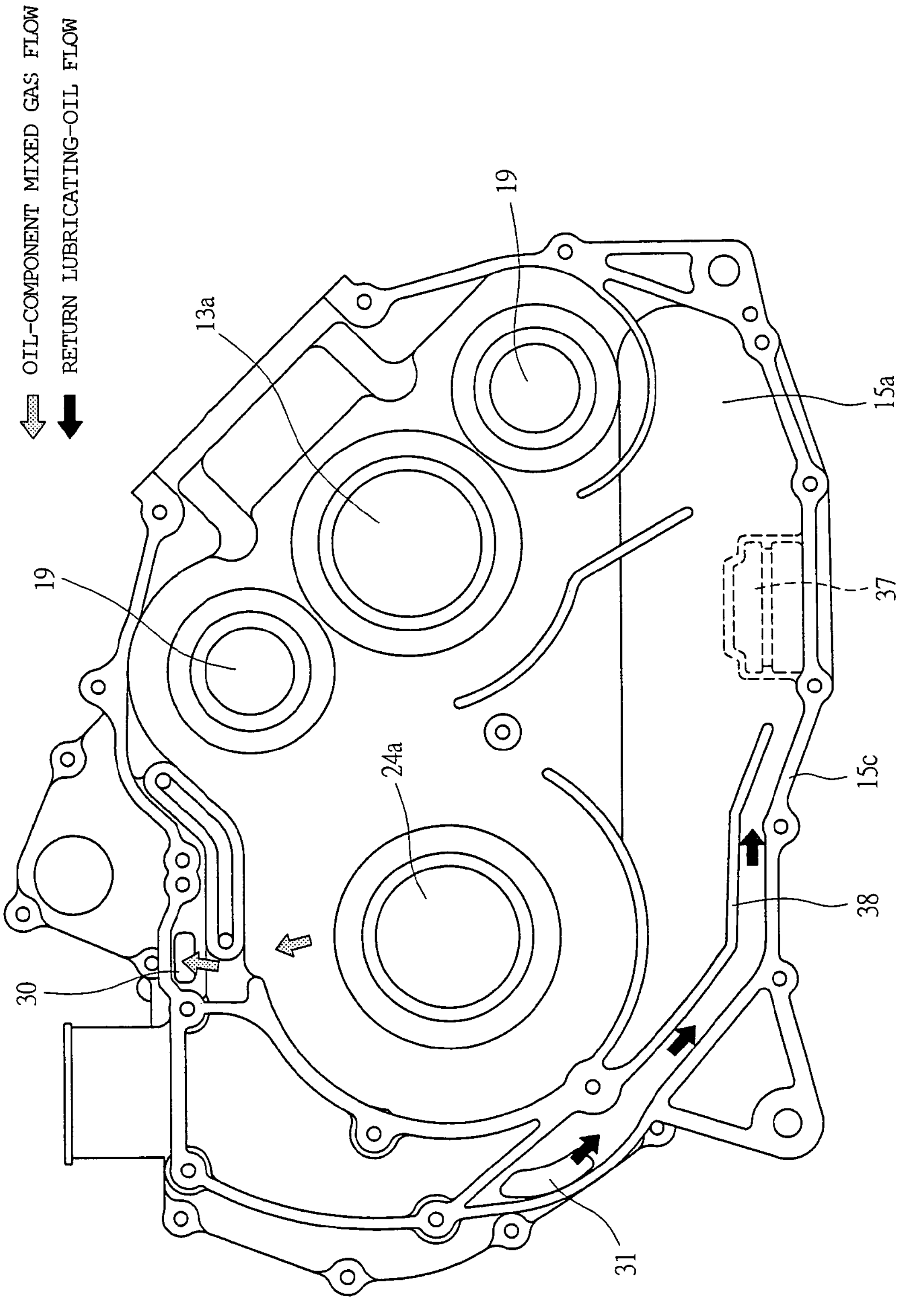
FIG. 3 is a view of a crankcase taken along line III-III in FIG. 2.
Figure 4:
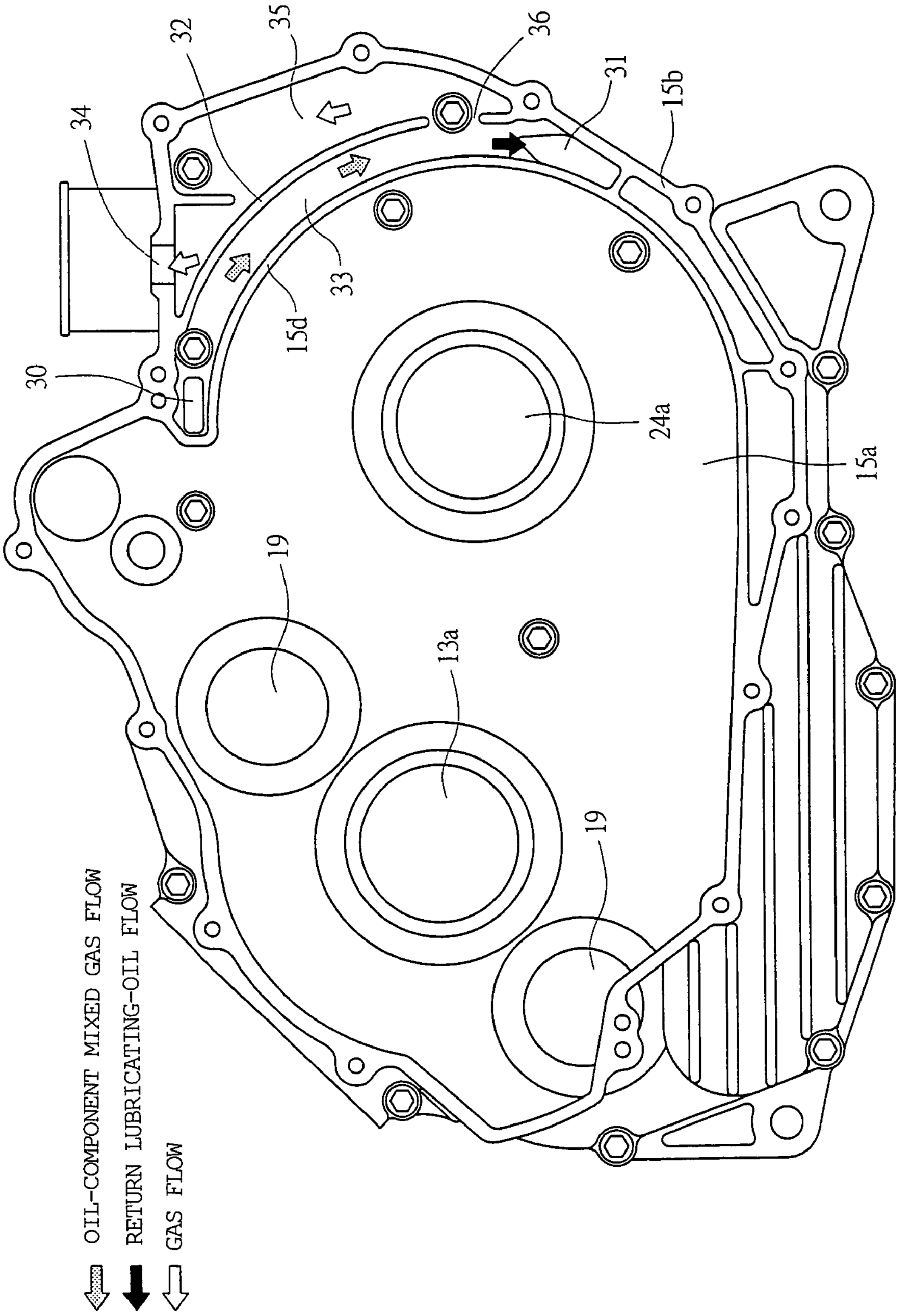
FIG. 4 is a view of a crankcase taken along line IV-IV in FIG. 2.

FIG. 2 is a schematic diagram showing a power transmission system of the vehicle, which has a breather apparatus of a crankcase according to one embodiment of the present invention and is mounted on the vehicle shown in FIG. 1; FIG. 3 is a view of the crankcase taken along line III-III in FIG. 2; and FIG. 4 is a view of the crankcase taken along line IV-IV in FIG. 2. As shown in FIG. 2, an engine unit 10 outputting engine power is provided on a vehicle-front side, and a driving unit 11 transmitting engine power to driving wheels 2 and 3 is provided on a rear side of the engine unit 10.

In a crankcase 12 of the engine unit 10, a crankshaft 13 is rotatably accommodated via a bearing. The crankcase 12 has: a case body 14 rotatably supporting one end of the crankshaft 13 via a bearing; and a case body 15 rotatably supporting the other end of the crankshaft 13 via a bearing and assembled into the case body 14, wherein a crank chamber 16 is formed therein by assembling these case bodies 14 and 15 to each other and, therefore, lubricating oil is accommodated in the crank chamber 16. An oil pump 17 is provided in the case body 14 and a rotor of this oil pump 17 is driven by the crankshaft 13, so that the lubricating oil is pressure-supplied to respective sliding portions of the driving unit 11 via oil paths not illustrated.

Two balancer shafts 18 are rotatably attached to the crankcase 12 via bearings, and a balancer weight 18*a* is provided integrally to each of the balancer shafts 18. A gear 18*b* provided on each of the balancer shafts 18 is engaged with a gear 20 provided on the crankshaft 13, whereby rotation fluctuation of the crankshaft 13 is absorbed by each balancer weight 18*a*. Note that, as shown in FIGS. 3 and 4, through holes 19 through which the respective balancer shafts 18 pass are formed in the case body 15 and, in FIG. 2, one of the balancer shafts 18 is shown.

A power generator 21 driven by the crankshaft 13 is provided to the other end of the crankshaft 13, and electric power generated by this power generator 21 is charged into an unshown battery. A starter motor 22 is provided so as to be adjacent to the power generator 21, and rotation of the starter motor 22 driven at the time of starting the engine is transmitted via gears 23*a* and 23*b* to the crankshaft 13. The power generator 21 and the starter motor 22 are accommodated in a power-generator case 25 attached to the case body 15.

As shown in FIG. 2, a subshaft 24 is rotatably mounted to the crankcase 12 in parallel with the crankshaft 13. A gear 26*a* provided on this subshaft 24 is engaged with a gear 26*b* provided on the crankshaft 13, whereby the rotation of the crankshaft 13 is transmitted to the subshaft 24. A recoil starter 27 for starting the engine manually is mounted on a recoil cover 25*a* assembled into the power-generator case 25, and is used when it is difficult to start the engine due to a shortage of a charge amount of the battery. The recoil starter 27 includes: a recoil pulley 28*b* that is accommodated in the recoil cover 25*a* and around which a recoil rope 28*a* is wound; and a recoil drum 28*c* attached to the subshaft 24, so that, by pulling the recoil rope 28*a* to rotate the recoil pulley 28*b*, the crankshaft 13 is rotated via the subshaft 24 and thereby the engine can be started.

The case body 15, as shown in FIGS. 3 and 4, has a vertical wall 15*a* in which, in addition to the through holes 19, a through hole 13*a* through which the crank shaft 13 passes, and a through hole 24*a* through which the subshaft 24 passes are formed. An outer circumferential wall 15*b* protruding to the outside therefrom is integrally provided, as shown in FIG. 4, to the vertical wall 15*a*, and further an outer circumferential wall 15*c* protruding to the inside therefrom is integrally provided, as shown in FIG. 3, to the vertical wall 15*a*. An end surface of the outer circumferential wall 15*b* serves as an abutment surface, on which an abutment surface of the power-generator case 25 as a wall body abuts. Meanwhile, the end surface of the outer circumferential wall 15*c* serves as an abutment surface, on which an abutment surface of the case body 14 abuts.

As shown in FIG. 4, on the vertical wall 15*a* of the case body 15, an inside wall 15*d* protruding to the outside therefrom is integrally provided, and the end surface of this inside wall 15*d* serves as an abutment surface, on which the abutment surface of the power-generator case 25 as a wall body abuts. On the vertical wall 15*a* and outside the inside wall 15*d*, an opening 30 is formed as shown in FIGS. 3 and 4, whereby an oil-component mixed gas in the crank chamber 16 flows via the opening 30 to the outside of the case body 15.

Under the vertical wall 15*a* and outside the inside wall 15*d*, a lubricating-oil return port 31 is formed, and a partition wall 32 is provided outside the inside wall 15*d*. Accordingly, the opening 30 communicates with the lubricating-oil return port 31, via a breather path 33 attached to the case body 15 and surrounded and formed by: the power-generator case 25 as a wall body; the inside wall 15*d*; the partition wall 32; and the vertical wall 15*a*.

A breather hole 34 is formed in the outer circumferential wall 15*b*, and this breather hole 34 communicates with an air-breather path 35 formed between the partition wall 32 and the outer circumferential wall 15*b*. A lower end of the air-breather path 35 communicates with the breather path 33 via a notched portion 36 formed in the partition wall 32, and the air-breather path 35 is formed so as to branch from the breather path 33. Due to this, the oil-component mixed gas having flown out from the crank chamber 16 into the opening 30 flows in the breather path 33 downward, and reaches the lubricating-oil return port 31 in a liquefied state by a large inertia force directed downward since the oil components of the oil-component mixed gas are larger in specific gravity than the gas components thereof, and therefore returns to the crank chamber 16. Meanwhile, the gas components are reversed upward and flow from the notched portion 36 to the air-breather path 35, and flow out from the breather hole 34 to the outside of the crankcase 12.

As shown in FIG. 3, in the bottom of the crank chamber 16, a strainer 37 for filtering the lubricating oil supplied to the oil pump 17 is provided. On the inner surface of the vertical wall 15*a*, there is provided a guide member 38 for guiding the oil components flowing from the lubricating-oil return port 31 into the crank chamber 16 toward the strainer 37. Therefore, the oil components having flown from the lubricating-oil return port 31 into the crank chamber 16 are securely returned into the lubricating oil accommodated in the bottom of the crank chamber 16. For this reason, to separate the oil components and the gas components of the oil-component mixed gas, while the oil-component mixed gas flows in the breather path 33 without providing a breather chamber having a large volume, the high specific-gravity oil components are guided downward and the gas components are reversed upward, by the air-breather path 35 provided so as to branch from the breather path 33, and are guided to the outside of the crankcase 12. Accordingly, it is possible to certainly prevent the oil components from leaking out to the outside without increasing the external dimensions of the crankcase 12.

As shown in FIG. 2, a centrifugal clutch 41 is attached to the other end of the subshaft 24, and this centrifugal clutch 41 has a clutch drum 41*a* rotatably attached to the crankcase 12, and a rotating plate 41*b* fixed to the subshaft 24. A plurality of arc-shaped clutch shoes 41*c* are attached to the rotating plate 41*b*, and each clutch shoe 41*c* becomes rotatable by a pin 41*d* attached to one end of the clutch shoe. A tensile coil spring 41*e* is attached to the other end of the clutch shoe 41*c*, and a spring force is exerted on the clutch shoe 41*c* in a direction away from the inner circumferential surface of the clutch drum 41*a*. Accordingly, when the subshaft 24 exceeds a predetermined rotation speed, a centrifugal force exerted on the clutch shoe 41*c* exceeds the spring force, whereby the clutch shoe 41*c* is engaged with the inner circumferential surface of the clutch drum 41*a* and the centrifugal clutch 41 becomes in a fastening state and an engine driving force from the crankshaft 13 is transmitted via the subshaft 24 to the clutch drum 41*a*.

A primary shaft 42 is fixed to the clutch drum 41*a*, and this primary shaft 42 is rotatably accommodated in a transmission case 43 assembled into the crankcase 12. Also, a secondary shaft 44 is rotatably accommodated in the transmission case 43 in parallel with the primary shaft 42, and a continuously variable transmission 45, transmitting the engine-driving force required to shift from the primary shaft 42 to the secondary shaft 44, is mounted in the transmission case 43.

This continuously variable transmission 45 is a belt type one, and the continuously variable transmission 45 includes a primary pulley 46 provided on the primary shaft 42, end a secondary pulley 47 provided on the secondary shaft 44. The primary pulley 46 has a fixing sheave 46*a* formed as a circular conical surface, and a moving sheave 46*b* formed as a circular conical surface opposite to the fixing sheave 46*a*, wherein the fixing sheave 46*a* is fixed to the primary shaft 42 and the moving sheave 46*b* is movably mounted axially on a spline provided on the primary shaft 42. Meanwhile, the secondary pulley 47 has a fixing sheave 47*a* formed as a circular conical surface, and a moving sheave 47*b* formed as a circular conical surface opposite to the fixing sheave 47*a*, wherein the fixing sheave 47*a* is fixed to the secondary shaft 44 and the moving sheave 47*b* is movably mounted axially on a spline provided on the secondary shaft 44.

A V belt 50 is provided to extend for winding between the primary pulley 46 and the secondary pulley 47, and when contact diameters of the primary pulley 46 and the secondary pulley 47 with the V belt 50 are changed, a speed ratio of the rotation of the primary shaft 42 is continuously varied and the rotation is transmitted to the secondary shaft 44. On the moving sheave 46*b* of the primary pulley 46, a plurality of cylindrical weights 51, for example, six cylindrical weights 51 are mounted in such a direction as to be at right angle to the rotation center of the primary shaft 42. A cum surface 52 corresponding to each of the centrifugal weights 51 is formed on the moving sheave 46*b*, and this cum surface 52 has a shape in which a radial-outer portion of the moving sheave 46*b* protrudes toward an end of the primary shaft 42. To the primary shaft 42, a cum plate 53 is fixed so as to be opposite to the cum surface 52, and a radial-outer portion of the cum plate 53 is inclined so as to be close to the cum surface 52. Meanwhile, a spring seat 54 is fixed to the secondary shaft 44, and a compression coil spring 55 for adding a fastening force to the V belt 50 is mounted between the spring seat 54 and the moving sheave 47*b*.

As the rotation speed of the primary shaft 42 becomes higher, the centrifugal force exerted on each centrifugal weight 51 becomes larger. Therefore, each centrifugal weight 51 moves in a radial-outer direction while it push-spreads a space between the moving sheave 46*b* and the cum plate 53. Herein, since the cum plate 53 is fixed to the primary shaft 42, the moving sheave 46*b* approaches toward the fixing sheave 46*a* by movement of the centrifugal weights 51. Thereby, since groove width of the primary pulley 46 is narrowed, the contact diameter of the V belt 50 with the primary pulley 46 becomes larger. In contrast, since groove width of the secondary pulley 47 is widened against the spring force by the V belt 50, the contact diameter of the V belt 50 with the secondary pulley 47 becomes smaller. Namely, the higher the rotation speed of the primary shaft 42 becomes, the higher speed range the speed ratio of the continuously variable transmission 45 is shifted to.

As the rotation speed of the primary shaft 42 becomes lower and the centrifugal force exerted on each centrifugal weight 51 become smaller, the groove width of the secondary pulley 47 is narrowed by a spring force applied to the secondary pulley 47. Accordingly, the contact diameter of the V belt 50 with the secondary pulley 47 becomes larger. In contrast, since the groove width of the primary pulley 46 is widened by the V belt 50, the contact diameter of the V belt 50 with the primary pulley 46 becomes smaller. Namely, the lower the rotation speed of the primary shaft 42 becomes, the lower speed range the speed ratio of the continuously variable transmission 45 is shifted to.

One end of the secondary shaft 44 protrudes from the transmission case 43, and is supported via a bearing by a gear case 56 assembled into the transmission case 43. In the gear case 56, an output shaft 57 is rotatably accommodated in parallel with the secondary shaft 44, and a wheel shaft 58 is rotatably mounted in parallel with the output shaft 57.

A forward-moving gear 69*a* is integrally provided on the secondary shaft 44, and this gear 69*a* always engages with a gear 69*b* rotatably mounted on the output shaft 57. Further, a rearward-moving sprocket 60*a* is integrally provided on the secondary shaft 44, and a chain 60*c* is provided to extend for winding between the sprocket 60*a* and a sprocket 60*b* rotatably mounted on the output shaft 57. Namely, the rotation direction of the gear 69*b* gear-driven by a driving force from the secondary shaft 44 becomes reverse to that of the secondary shaft 44, and the rotation direction of the sprocket 60*b* chain-driven becomes same as that of the secondary shaft 44.

A forward/rearward switch mechanism 61 is mounted between the gear 69*b* and the sprocket 60*b*, and the driving forces from the gear 69*b* and the sprocket 60*b* are selectively transmitted to the output shaft 57 in accordance with a shifting operation of the forward/rearward switch mechanism 61. This forward/rearward switch mechanism 61 has a pair of switch disks 62*a* and 62*b* each engaging with the spline of the output shaft 57, wherein these switch disks 62*a* and 62*b* become slidable axially with regard to the output shaft 57. The switch disk 62*a* is provided with engagement teeth 63*b* engaged with engagement teeth 63*a* provided on a side surface of the gear 69*b*, and the switch disk 62*b* is provided with engagement teeth 64*b* engaged with engagement teeth 64*a* provided on a side surface of the sprocket 60*b*. Therefore, when the-engagement teeth 63*a* and 63*b* are engaged with one another by moving the pair of switch disks 62*a* and 62*b* toward the gear 69*b*, the rotation of the secondary shaft 44 is transmitted via the forward-moving gears 69*a* and 69*b* to the output shaft 57. Meanwhile, when the engagement teeth 64*a* and 64*b* are engaged with one another by moving the switch disks 62*a* and 62*b* toward the sprocket 60*b*, the rotation of the secondary shaft 44 is transmitted via the rearward-moving sprockets 60*a* and 60*b* to the output shaft 57. Note that, as shown in FIG. 2, where the switch disks 62*a* and 62*b* are not engaged with any engagement teeth, the connection between the secondary shaft 44 and the output shaft 57 is cut off.

A pair of switch disks 65*a* and 65*b* each engaging with the spline of the output shaft 57 are slidably mounted axially on the output shaft 57, and the switch disk 65*b* is provided with engagement teeth 66*b* engaged with engagement teeth 66*a* provided on the gear case 56. Therefore, when the engagement teeth 66*a* and 66*b* are engaged with one another by moving the pair of switch disks 65*a* and 65*b* toward the gear case 56, the output shaft 57 and the gear case 56 are fastened, whereby the rotation of the output shaft 57 is regulated. In contrast, as shown in FIG. 2, when an engaging state of the engagement teeth 66*a* and 66*b* is released, the output shaft 57 becomes in a rotatable state.

These switch disks 62*a*, 62*b*, 65*a*, and 65*b* are shifted by switch holders 67 and 68. The switch holders 67 and 68 are coupled via an unshown operating link to a shift lever 6 of the vehicle shown in FIG. 1, and the switch disks 62*a*, 62*b*,

65*a*, and 65*b* are shifted by the driver operating the change lever 6. There are set, at the change lever 6, position F for running forward, position R for running rearward, position N corresponding to a neutral state of the driving unit 11, and position P corresponding to a parking state of the vehicle.

A gear 59*a* is fixed to the output shaft 57 to which the driving force is transmitted in accordance with the operation of the change lever 6, and a gear 59*b* always engaging with the gear 59*a* is fixed to the wheel shaft 58. The rear wheels 3*a* and 3*b* are linked to ends of the wheel shaft 58, whereby the rear wheels 3*a* and 3*b* as driving wheels are driven by the wheel shaft 58.

Further, to brake the vehicle at the time of its run, as shown in FIG. 2, a brake disk 72 is attached to the output shaft 57, and a brake caliper 73 by which a brake pad 73*a* is engaged with the brake disk 72 is attached to the gear case 56. Since the driver operates the brake lever 7 provided to the handlebar 5, the brake caliper 73 is driven, whereby a braking force can be added to the output shaft 57.

Next, a circulation path of the oil-component mixed gas in the crankcase 12 at the time of the run will be explained hereinafter. When the engine is started by the starter motor 22 and the crankshaft 13 is rotated, the rotor in the oil pump 17 is driven by the crankshaft 13, whereby the lubricating oil is supplied to respective sliding portions among parts incorporated in the crank chamber 16 via an unshown oil path.

At this time, pressure fluctuations in the crank chamber 16 caused by a reciprocating action or the like of a piston (not illustrated) are adjusted by the gas components flowing in and out via the breather hole 34 formed at the above-mentioned position. Namely, when the pressure in the crank chamber 16 becomes high, the oil-component mixed gas of the inside flows into the breather path 33 from the opening 30 provided in the top of the case body 15 and gas and liquid are separated by the breather path 33, whereby only the gas components flow out via the breather hole 34 to the outside of the crank chamber 16. Herein, since the opening 30 is provided in a horizontal direction of the car body 1, the splashed lubricating oil does not flow directly into the opening 30. The oil-component mixed gas having flown into the opening 30 is guided, by the partition wall 32 and the inside wall 15*d* that are provided so as to expand toward the bottom of the crankcase 12, and the larger specific-gravity oil components of the oil-component mixed gas hitting the inner surface of the breather path 33 are liquefied and flow along the wall surface into the lubricating-oil return port 31. Meanwhile, the smaller specific-gravity gas components, from which the oil components have been separated, are separated from the liquefied oil components at the branching point of the air-breather path 35 and go up through the air-breather path 35, thereby allowing for flowing through the breather hole 34 to the outside. Namely, the breather path 33 provided so as to expand toward the bottom of the crankcase 12 prevents the oil-component mixed gas from directly flowing into the breather hole 34, and prevents the larger specific-gravity oil components liquefied from reaching the breather hole 34 by going up from the branching point of the air-breather path 35 even if the large specific-gravity oil components liquefied reach the branching point. Thus, in the breather apparatus according to the present invention, since gas and liquid components are separated while the oil-component mixed gas flows through the breather path 33, there is no need to provide the breather chamber unlike the prior arts.

Further, the oil components flowing into the lubricating-oil return port 31 are guided by the guiding member 38 expanding toward the strainer 37 provided on the bottom of the crankcase 12. Thereby, it is possible to collect, with good efficiency, the oil components separated in the breather path 33. The collected oil components are again used as lubricating oil and supplied to the respective sliding portions in the crank chamber 16. Note that, at this moment, flow directions of the oil-component mixed gas, the liquefied lubricating oil, and the gas from which the oil components has been removed are shown by the respective arrows in FIGS. 3 and 4.

The present invention is not limited to the above-mentioned embodiment, and can be variously modified and altered without departing from the gist thereof. For example, in the above-mentioned embodiment, the case where the breather apparatus of the engine according to the present invention is applied to the all-terrain running vehicle such as a buggy vehicle has been explained in detail. However, the present invention may be used as a breather apparatus of other engine. Also, an air cleaner to be arranged in an air intake system of engine may be connected to the breather hole 34 for discharging the gas components, or the gas after the separation of the oil components may be discharged to the outside of the crankcase 12 by directly attaching an air filter to the breather hole 34. Further, by attaching the power-generator case 25 to the outside of the case body 15, the power-generator case is used as a wall body to form the breather path 33 and the air-breather path 35. However, the respective paths 33 and 35 may be formed by using members other than the power-generator case 25.

According to the present invention, the wall body is attached to the inside of the crankcase to form the breather path and the air-breather path, so that it is possible to perform a breather in the crank chamber without increasing the width dimension of the crankcase.

Since the breather path is formed by the wall body expanding toward the bottom of the crankcase, the lubricating oil liquefied on the wall surface of the breather path can be made to flow smoothly into the lubricating-oil return port without being accumulated therein. Additionally, the air-breather path provided so-as to branch from the breather path is provided toward the top of the car body, whereby it is possible to prevent the lubricating oil from leaking out from the breather hole.

Further, the lubricating oil flowing into the lubricating-oil return port is guided by the guiding member expanding toward the strainer provided on the bottom of the crankcase, so that it is possible to efficiently collect the lubricating oil. Therefore, there is no need to increase the accumulative amount of lubricating oil due to the low efficiency of collecting the lubricating oil circulating in the crank chamber.

The entire disclosure of a Japanese Patent Application No. 2003-140548, filed on May 19, 2003 including specification, claims, drawings and summary, on which the Convention priority of the present application is based, is incorporated herein by reference in its entirety.

What is claimed is:

1. A breather apparatus of an engine with the engine having a crankcase with a crank chamber accommodating lubricating oil and a case attached to said crankcase to form a housing for an output gear train, wherein said breather apparatus comprises:

a vertical wall provided to support a crankshaft of the engine and said vertical wall having an interior side facing the crank chamber and an exterior side facing away from the crank chamber;

an outer circumferential wall extending away from the exterior side of said vertical wall for abutment with the case when the case is attached to the crankcase;

an inside wall provided on the exterior side of said vertical wall and positioned inside said outer circumferential wall and extending away from said vertical wall for abutment with the case;

a partition wall provided between said outer circumferential wall and said inside wall and extending away from said vertical wall for abutment with the case, and to thereby form a breather path together with said inside wall at a location external to said crank chamber;

an opening formed on said vertical wall at an upper portion of said breather path to flow an oil-component mixed gaseous substance generated in the crank chamber into said breather path;

a lubricating-oil return port formed on said vertical wall at a lower portion of said breather path to return an oil component of the oil-component mixed gaseous substance toward the crank chamber;

a guide member provided on the interior side of said vertical wall and extending from said lubricating-oil return port toward a bottom portion of the crank chamber to guide the oil component into the lubricating oil accommodated in the crank chamber; and a notched portion formed on said partition wall to flow out a gaseous component of the oil-component mixed gaseous substance to outside of the engine.

2. The breather apparatus according to claim 1, wherein an air-breather path is formed between the partition wall and the outer circumferential wall.

3. The breather apparatus according to claim 2, further comprising a breather hole formed on the outer circumferential wall, wherein said breather hole communicates with said breather path.

4. The breather apparatus according to claim 1, wherein the breather path is formed to extend downwardly from the opening to the lubricating-oil return port.

5. The breather apparatus according to claim 1, wherein the breather path and the air breather path are separated by the partition wall.

6. The breather apparatus according to claim 1, wherein the breather path is arranged to be positioned radially internal to the air breather path.

7. A breather apparatus for use in an engine, with the engine having a crankcase with a crank chamber and a casing for an output gear train, with the crankcase being secured to the casing, said breather apparatus comprising:

a vertical wall of the crankcase, with the vertical wall having an internal surface, an external surface and a crankshaft reception aperture and wherein the internal surface of the vertical wall is exposed to lubricating oil in the crank chamber;

an outer circumferential wall provided on the external surface of said vertical wall and extending off from the external surface of said vertical wall to provide a close-off relationship relative to the casing when the casing is secured to the crankcase;

an inside wall provided on the external surface of said vertical wall and positioned radially internal to said outer circumferential wall, said inside wall also extending away from said vertical wall to provide a close-off relationship relative to the casing when the casing is secured to the crankcase;

a partition wall provided between the outer circumferential wall and said inside wall, said partition wall extending away from the external surface of said vertical wall to form a close-off relationship with the casing, and said partition wall being arranged to form a breather path relative to said inside wall;

a feed port with an opening that enables a flow through of an oil-component mixed gaseous substance generated in the crank chamber to the breather path;

a lubricating-oil return port provided with an opening at a lower region of the breather path to return an oil component of the oil-component mixed gaseous substance toward the crank chamber; and a communication port formed in the partition wall, which the communication port being positioned to provide for inertia separation of the oil component of the oil-component mixed gaseous substance from a more gaseous component of the oil-component mixed gaseous substance, with the separated oil component being directed toward said lubricating-oil return port and the more gaseous component of the oil-component mixed gaseous substance being directed to an air breather path in communication with said communication port.

8. The breather apparatus according to claim 7, further comprising:

a guide member provided on the internal surface of said vertical wall, said guide member extending from the lubricating-oil return port, which is formed in a lower region of said vertical wall, toward a lower region of the crank chamber to guide the returned oil component to a lubricating oil supply in the crank chamber.

9. The breather apparatus according to claim 7, wherein the opening of said feed port is provided at an upper region of the vertical wall.

10. The breather apparatus according to claim 7, wherein the communication port is defined by a break in the partition wall.

11. The breather apparatus according to claim 7, wherein the breather path is formed to extend downwardly from the opening of said feed port to the lubricating-oil return port.

12. The breather apparatus according to claim 7, wherein the breather path and the air breather path are separated by the partition wall.

13. The breather apparatus according to claim 7, wherein the breather path is arranged to be positioned radially internal to the air breather path.

14. A breather apparatus for use in an engine, with the engine having a crankcase with a crank chamber and a casing for an output gear train, with the casing being supported by the crankcase, said breather apparatus comprising:

a vertical wall of the crankcase, with the vertical wall having an internal surface and an outer surface with the internal surface of the vertical wall being exposed to lubricating oil in the crank chamber;

an outer circumferential wall extending between the outer surface of said vertical wall and the casing;

an inside wall extending between the outer surface of said vertical wall and the casing and positioned radially internal to said outer circumferential wall;

a partition wall provided between the outer circumferential wall and said inside wall, and said partition wall being arranged to form a breather path relative to said inside wall;

said breather apparatus further comprising a feed port having an opening to enable a flow through of an oil-component mixed gaseous substance generated in the crank chamber to the breather path, and a lubricating-oil return port provided at a lower region of the breather path to return an oil component of the oil-component mixed gaseous substance toward the crank chamber; and a communication port formed in the partition wall, which the communication port being positioned to provide for inertia separation of the oil component of the oil-component mixed gaseous substance from a more gaseous component of the oil-component mixed gaseous substance, with the separated oil component portion being directed toward said lubricating-oil return port and the more gaseous component of the oil-component mixed gaseous substance being directed to an air breather path in communication with said communication port.

15. The breather apparatus according to claim 14, further comprising:

a guide member provided on the internal surface of said vertical wall, said guide member extending from the lubricating-oil return port which is provided in the vertical wall toward a lower region of the crank chamber to guide the returned oil component to a lubricating oil supply in the crank chamber.

16. The breather apparatus according to claim 14, wherein the opening of the feed port is provided at an upper region of the vertical wall.

17. The breather apparatus according to claim 14, wherein the communication port is defined by a break in the partition wall.

18. The breather apparatus according to claim 14, wherein the breather path is formed to extend downwardly from the opening of the feed port to the lubricating-oil return port.

19. The breather apparatus according to claim 14, wherein the breather path and the air breather path are separated by the partition wall.

20. The breather apparatus according to claim 14, wherein the breather path is arranged to be positioned radially internal to the air breather path.

* * * * *